May 5, 1970  M. TRUPP  3,510,089
PROPULSION SYSTEM
Filed Dec. 16, 1965  2 Sheets-Sheet 1

INVENTOR
MASON TRUPP

BY Sherman Levy
ATTORNEY

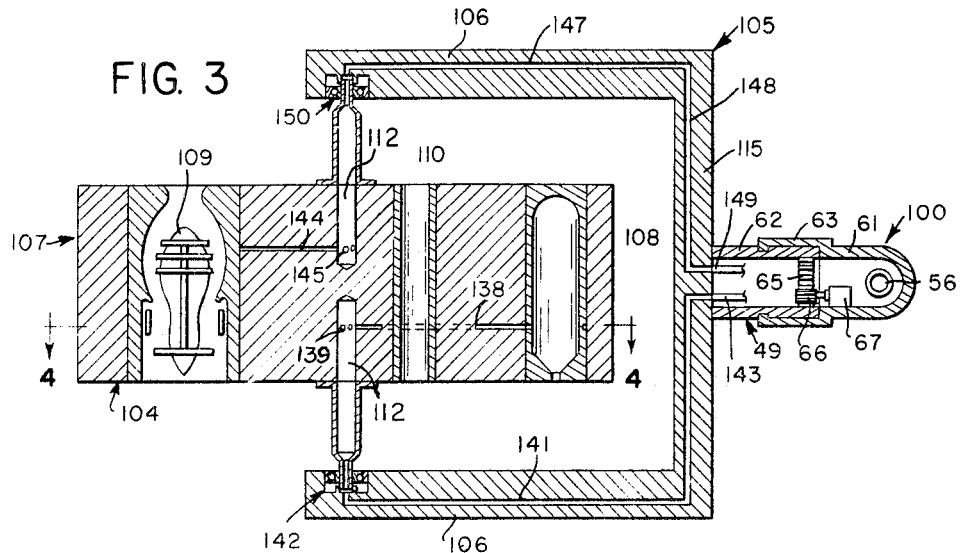
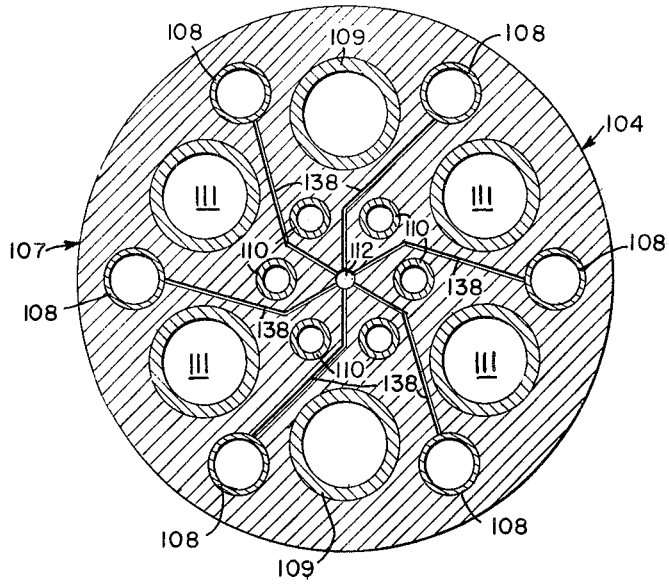

United States Patent Office 3,510,089
Patented May 5, 1970

3,510,089
PROPULSION SYSTEM
Mason Trupp, 310 Blanca Lane, Tampa, Fla. 33606
Continuation-in-part of application Ser. No. 372,178, June 3, 1964. This application Dec. 16, 1965, Ser. No. 514,190
Int. Cl. B64c 29/00
U.S. Cl. 244—62                                     1 Claim

ABSTRACT OF THE DISCLOSURE

A propulsion system for aircraft and the like which includes a power means that has improved efficiency and wherein there is used the compound action of a spinning jet engine console to produce a reaction plume or plug of matter and energy upon which the aircraft operates and supports itself.

---

The present invention relates to a propulsion system or arrangement, and the present invention is a continuation-in-part of my prior pending patent applications, such as patent applications Ser. No. 395,535, filed Sept. 10, 1964, and now Pat. No. 3,250,496; Ser. No. 372,178 filed June 3, 1964 and now Pat. No. 3,250,495; and Ser. No. 461,179, filed June 3, 1965, and now Pat. No. 3,323,759.

It is an object of this invention to provide a new and improved propulsion mechanism for aircraft and the like, wherein there is provided a power means which has improved efficiency and wherein the present invention overcomes disadvantages of prior means and methods heretofore intended to accomplish generally similar purposes.

An object of the present invention is to provide a simple and efficient means of propelling a craft such as an aircraft, and wherein the aircraft may have various shapes or configurations, and wherein in one form of the present invention there is utilized the action of a compound photonic spinning jet engine console consisting of a plurality of engines to produce a reaction plume photonic plug of matter and energy upon which the aircraft operates and supports itself.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIG. 3 is a sectional view taken on the line 3—3 of FIG. 2.

FIG. 4 is a sectional view taken on the line 4—4 of FIG. 3.

Figure 1:
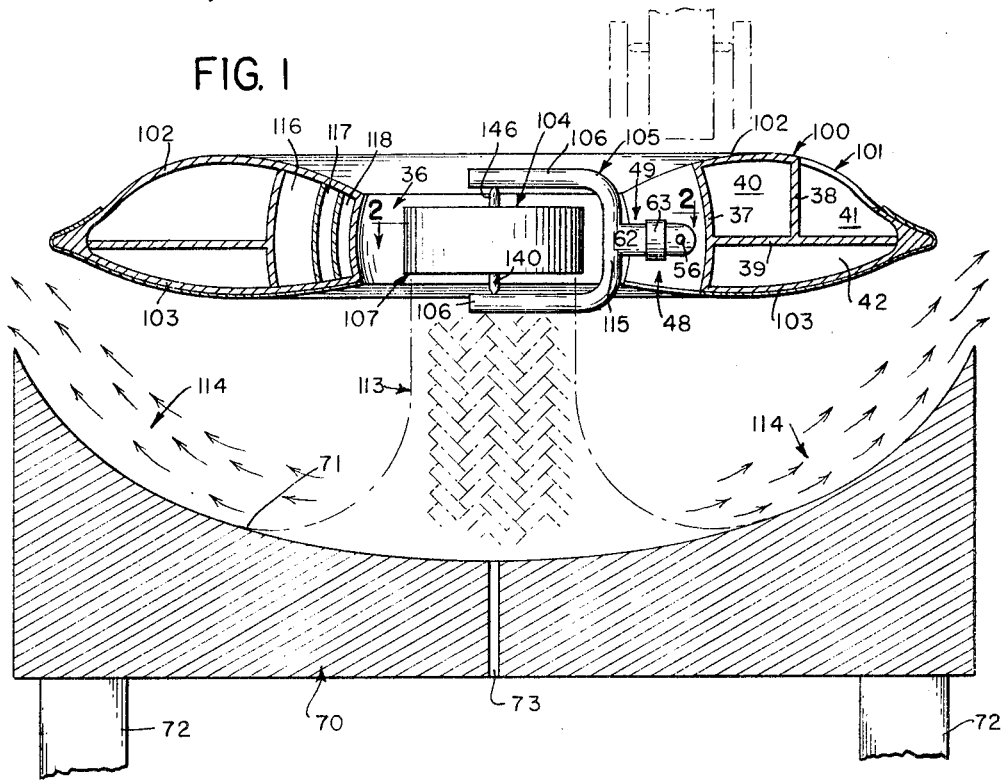
FIG. 1 is a longitudinal sectional view generally along the center line and illustrating one application of the present invention.

Referring in detail to the drawings, the numeral 100 indicates an aircraft or vehicle which is constructed and which operates in accordance with the principles of the present invention, and inasmuch as certain details of construction are somewhat similar to those shown and described in my prior patent applications such as prior patent application Ser. No. 461,179, attention is directed to this prior patent application Ser. No. 461,179 to facilitate an understanding of the present invention. The aircraft 100 is adapted to include a body member 101 which is provided with arcuate top and bottom surfaces 102 and 103. The numeral 70 indicates a track or trackway which is adapted to be supported on elements or supports 72, FIG. 1, and the track 70 may be provided with drainage openings 73, and the numeral 71 indicates the upper arcuate surface of the trackway 70. The body member 101 is provided with suitable walls and partitions such as those indicated by the numerals 47, 48 and 39, whereby there is defined within the body member 101 compartments or chambers as indicated by the numerals 40, 41 and 42.

The inner central portion of the body member 101 is open as indicated by the numeral 36, and the numeral 37 indicates the inner circular wall portion which corresponds to the wall portion 37 shown in prior patent application Ser. No. 461,179.

The numeral 104 indicates a compound jet propulsion unit which is arranged in the inner central open portion 36, and the numeral 105 indicates a yoke which includes spaced apart legs 106 as well as an intermediate connecting portion 115, FIG. 1.

Figure 2:
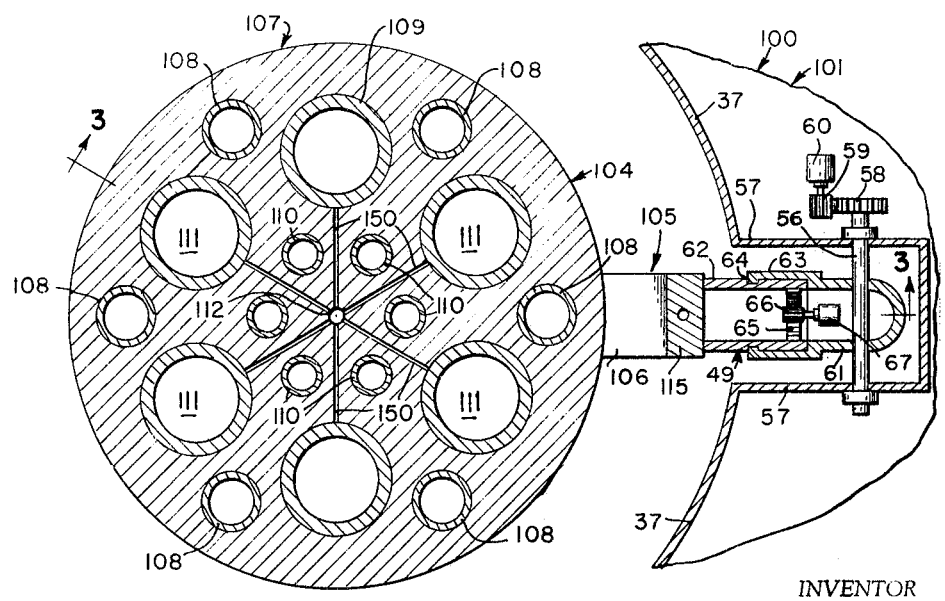
FIG. 2 is an enlarged sectional view taken on the line 2—2 of FIG. 1.

A standard or column 49 is operatively connected to the connecting portion 115 of the yoke 105 as shown in the drawings. As shown in FIG. 2, and as described in detail in prior patent application Ser. No. 461,179, the recessed portion 48 has extending therethrough a shaft 56, which is suitably affixed to the standard 49, and the shaft 56 is journaled in the wall portions 57 of the member 101. A gear member 58 is connected to an end of the shaft 56, and a gear 59 meshes with the gear member 58, there being a motor or the like 60 for operating the gear 59 whereby the shaft 56 can be turned to pivot the standard 49. The standard 49 may be made in two parts of sections, namely the sections 61 and 62, and wherein the section 61 is suitably affixed to the shaft 56. A shoulder portion 63 is integral with the section 61 and has an end portion thereof arranged in engagement with an annular groove 64 of the section 62 whereby relative rotation between the sections 61 and 62 can take place in the desired manner. The section or portion 62 is secured to or formed integral with the semicircular yoke 105.

A ring gear 65 is suitably mounted within the section 62 of the standard 49, and a gear 66 is arranged in meshing engagement with the ring gear 65, and a motor 67 can be used for driving or rotating the gear 66. This construction permits or provides for rotational movement or swinging movement of the yoke 105 about an axis extending through the standard 49 whereby the unit 107 can be positioned in the desired location.

Mounted in the console or base unit 107 is a plurality of rocket nozzles which may be arranged adjacent the outer periphery of the console or base unit 107, as shown in FIG. 2. A plurality of fan jets 109 are arranged in the unit 107 contiguous to the rocket nozzles 108, and a plurality of the photon engines 110 are arranged in the base unit 107, and these may be spaced inwardly from the fan jet engines and rocket engines. The consoles may be provided with a hybrid system of engines for selective use depending upon whether the craft is traversing atmosphere or in space. The ram jets can be placed suitably in any of the positions designated 111. As shown in FIG. 1, a photonic plug 113 is produced by the console assembly, and this photonic plug 113 may engage the recessed surface 71 of the track 70 and may have its wake spread out as indicated by the arrows as indicated by the numeral 114 in FIG. 1.

In FIG. 1 the numeral 116 may indicate a chamber or space for jet fuel, while the numeral 117 indicates a similar rocket fuel space, and the numeral 118 may be used as a convenient location for a suitable oxidizer.

There is further provided a suitable means for supplying fuel to the various engines such as engines 108, 109, 110 and 111. Thus, fuel for the rocket engines 108 is adapted to be supplied from a suitable source of supply or location through passageways 138, and these passageways 138 receive the rocket fuel from ports 139 and tubular sections or ducts 140, and the ducts 140 receive fuel from the passageway 141 which has a passageway or section 143 connected in a suitable manner to a rocket fuel supply such as the fuel supply area or chamber 117. A ball bearing assembly 142 may be provided for permitting the necessary rotation to take place without interrupting the fuel supply to the engines 108, FIG. 3. Similarly, passageways 144 are adapted to be used for supplying fuel to the jet engines 109, and the passageways 144 are operatively connected to a tubular member 146 by means of ports 145, and duct 140 receives its jet fuel from a passageway 147 which has a section 148 connection to a section 149, FIG. 3, and the section 149 is adapted to be connected to a suitable source of supply or jet fuel chamber 116. A ball bearing assembly 142 is adapted to be used at the juncture of the duct 140 and the leg 106 so as to permit rotation of the base unit 107 to take place without interruption of the supply of jet fuel into engines 109.

A similar fuel supply arrangement may be used to supply fuel to the photons 110 as well as to the ram jets 111.

From the foregoing, it will be seen that there has been provided a propulsion system which is an improvement over prior such mechanisms, and in use with the parts arranged as shown in the drawings, it will be seen that an aircraft such as aircraft 100 can be used in a suitable location such as above a trackway 70. The plurality of engines such as engines 108, 109, 110, 111 combine to form or produce the combined photonic plug 113, and this plug, when contacting suitable surfaces such as the arcuate surfaces 71, will follow the direction of the arrows 114 so that the aircraft 100 will move through the air on a cushion of air in the desired manner.

If desired, a central supply of fuel can be supplied through a suitable line to overcome the effects of centrifugal force in directing the fuel into the console.

With further reference to the photon jets, rocket nozzles, ram jet, and fan jets, the photon jet engines 110 can be included within the console assemblies and can be energized and stopped at will from the astronaut's compartment. The rocket jets 108 can obtain fuel from a suitable compartmentalized cell arrangement which is separated from the main fuel compartments used for jet fuel, or solid fuel rockets can be used.

It will therefore be seen that according to the present invention there has been provided a compound photonic plug jet propulsion arrangement. The present invention is directed to a system or mechanism and air frame arrangement, and this patent application is a continuation-in-part of prior patent applications Ser. No. 372,178, filed June 3, 1964; Ser. No. 395,359, filed Sept. 10, 1964; and Ser. No. 461,179, filed June 3, 1965. With the present invention there is provide a propulsion system and mechanism, and an air frame construction, and wherein a plurality of jets, and composite jet and ram jet engines is compounded by using a spinning console serves to produce a console energy system which produces and provides important and novel advantages over conventional aircraft and the like and their propulsion systems or mechanisms. Also, the present invention utilizes a spinning console for reaction engines. Also the present invention utilizes the reaction capabilities of a compounded photonic spinning jet engine console consisting of a plurality of composite reaction engines. The photonic plug is indicated by the numeral 113 in FIG. 1, and as shown in FIG. 1, the craft operates on and supports itself by virtue of this photonic plug.

The present invention produces the photonic plug of matter and energy as indicated by the numeral 113 and this photonic plug is manifolded so that the ejection plume will react to mute or eliminate the high level of noise emitted from the usual single jet units. There is produced a highly efficient augmented or increased mach number due to the advantages of manifolding, and there is produced a photonic plug against which the craft is continuously increasing its thrust since loss of thrust by disassociation does not occur as in other conventional jets and ram jets inasmuch as jet flame plume unmanifolded leaves the after section of the engine.

Furthermore, the present invention supplies an aerodynamic craft design which permits better utilization of the propulsion system which can be used in a flying saucer design which permits the advantages of a jet photonic plug to aquire advantages of vertical take-off and landing of aircraft of increased capability.

It is to be noted that the thrust from the spinning console is so manifolded that the ejection plume, because of molecular, ionic, and electronic photonic compounding, results in a plug of energy and matter upon which the craft supports itself and rides smoothly.

Also, it will be noted that in connection with conventional jets of all types including ram jets, the ejection plume, because of the nature of gas kinetics, loses thrust due to disassociation of particles and energy in its reaction plume. The manifolding of the energy and the ejected photonic particles produce a photonic plug similar to the Joule-Thomson-Kelvin effect which occurs in small tubing distal to a jet valve. An augmented similar plug cannot be produced except with the use of a console to manifold both the energy and matter ejected in the plume in the art of jet propulsion. Therefore, the similarity between the "crankshaft" of internal combustion engines and the function of the console in the present invention to compound plural reaction jet engines for quieter augmented thrust.

In addition, the aerodynamic principle involved in the selection of a flying bi-concave saucer design derives from the previous observations such as those referred to in patent application Ser. No. 395,535, wherein reference is made to the similarity of the design of the human red blood cell which by comparison to weight, size and speed is more efficient than any other previously designed craft. Its characteristics are superior to the weight thrust characteristics of the fly which for many years was a yardstick by which aerodynamists developed wing designs for lift and the like. As further reference, attention is directed to the shapes that a released group of free air bubbles assume under water as they rise to the surface, viz., bubbles which start off as spheroid rapidly assume a concave inferior surface and spin in increasing rapidity, as the surface is gained. In the latter observations, in no instance does the free bubble assume shapes similar to darts, deltas, needles, ailerons, tails or any of the conventional air frames. It is to be further kept in mind that a bubble is an aerodynamic particle or shape in a hydrodynamic medium. Also, when a craft of high mach capability operates in a dense atmosphere similar basic considerations are involved even though there are important differences only as to degree of density through which the craft must operate or travel.

There is further provided a console compounded and manifolded energy and matter photonic plug as indicated by the numeral 113 in FIG. 1 upon which a surface effect cushion vehicle can travel on at increased speed with greater safety than is available with presently constructed hover-craft vehicles which depend on plenums, skirts and low pressures which have prevented rapid development of the art since low pressures may be lost at critical operating conditions and are relatively more dangerous to accurate control than available high pressure systems.

The present invention also permits hypersonic vehicles to descend safely on arrival at airport destination in a vertical direction on a muted console manifolded compounded photonic jet plug which will reduce the annoyance produced by conventional jets in which high energy plumes are suddenly allowed to disassociate along a horizontally dangerous flight landing path at high speed at extremely high noise and vibration producing levels to structures along the flight path. It also eliminates the additional noise increments of reverse thrusters.

The present invention permits a craft which is a composite of ram jet and fan jet engines to augment the power of each and preserves the thrust of a craft and engine by the presence of a photonic plug which prevents disassociation of gas kinetics.

With further reference to such a composite engine, in the spinning console the central engine may be chosen as a ram jet module and the other plurality of engines can be arranged circumferentially around the console and these can be fan jet modules. The arrangement so constructed can be used for increased mach capability and also for letting the craft down through the atmosphere safely because of the gradient of temperature difference at the ejection site and the ability of the photonic plug to absorb and protect the craft from unusual heating. The craft may also be used as an orbiting laboratory. The passengers will not be subject to the loud roar of thrust reverses on landing but will land on the muted thrust of the photonic plug such as plug 113. The console can be veined for refrigerants. Turbulence will be reduced in the craft supported by the photonic plug 113 and the dangers of turbulence will be reduced or eliminated.

The photonic plug can be utilized to enable the craft to resist the tumbling in free flight because the plug orients the direction of flight at all times. Also, the spinning console photonic plug jet engine can be used as a producer or generator of electrical potential at will, derived from the spin of the console. Also, the compound photonic jet propulsion system is such that its ejection of particulate photonic matter as a reaction medium will make docking or joining up with other modules in space more precise and efficient.

With further reference to the bi-concave saucer design and compound photonic jet propulsion system, it is to be noted that this will permit it to approach, land and take off from other planets such as the moon without the necessity of using other landing modules. The orbiting manned laboratory in fact becomes also a landing module which can soften landing by virtue of its photonic plug. The prior art or prior jet propulsion devices are not similar to the present invention inasmuch as they do not utilize an arrangement in multiple units which can spin continuously while in operation throughout 360 degrees in all inclinations and declinations. This is merely exemplary of the various differences or advantages that the present invention has over prior jet propulsion devices and the like.

A plug effect described by Joule-Thomson-Kelvin is one which leads to inefficiency of gas dynamics in a closed system of tubing which results in difficulty in maintaining constant pressure. It is to be noted that by contrast the compound photonic plug jet propulsion device of the present invention manifolding of ablative products of fuel produces in the ejection stream an effective platform which is self-reconstituting of disassociated molecules, ions and other particles which increases thrust and mutes the noise which accompanies the dissipation of thrust energy into the atmosphere. Thus, because of rotation of the reaction plume the peripheral layers of combustion become increasingly dense because of centrifugalization of the reaction flame. This is important to the increase in thrust and reduction of noise. In the center of the reaction flame the molecules, atoms and ions of combustion are hottest. As they are centrifugalized the peripheral layers become denser and cooler producing a reconstitution of disassociated molecules.

The muting of the noise in the compound photonic jet propulsion device can be described similarly to the placing of a mute in a coronet, a trombone or as in muting the tympany of a drum head.

Another advantage of flight by compound photonic plug from space to planetary landing is the initiation of lift on return through the atmosphere which reduces the heating of the space craft, and on an approach normal or perpendicular to the earth's surface the elimination of curvilinear gravity and elimination of deploying drogues and parachutes will along a straight line approach to land area which would reduce the pathological effects of g (gravity) on the passengers.

Some of the features of the present invention are as follows:

There is provided a console compounded wake manifolding energy photonic thrust reaction jet system in which the injection and ejection moments are perpendicular to the plane of the console and is developed as a compound photonic plug jet propulsion means whereby the craft is operated and sustained in flight in greater stability on its photonic plug. By injection and ejection moments, the gradient of heat energy which exists between the inlets and outlets of the fan jets and the ram jets of the hybrid console and does not apply to the rocket engines or the photon engines which have only ejection outlets. The photonic plug acts to yield increased stability in surface effect vehicles of all shapes or configurations. In addition, when atmospheric, transatmospheric and space flight produces an undisassociated photonic plug, there will be augmented power to prevent loss of thrust energy. Also, the present invention is such that there will be developed an undisassociated photonic plug which mutes the noise produced by the engines rather than energy and thrust matter when not compounded by a spinning console. Also, the photonic plug acquires advantages for vertical take off and landing not similarly inherent in prior devices including docking in space, and this is important as compared to systems which lack a reconstituting photonic plug. Also, the photonic plug can absorb and dissipate excessive heating as is developed in passing from space through the atmosphere for planetary landings. The cooler or cooling peripheral layers of the centrifugalized reaction flame produces a heat sink into which heat from the console and from the craft itself can be transferred or dissipated. This applies especially to space vehicles which pass from space entering denser atmospheric layers as it passes through it.

There is also provided an improved aerodynamic bi-concave saucer design which is operatively amalgamated with a compound photonic plug jet propulsion mechanism for increased safety, speed, maneuverability, stability and quieter aircraft operation. Also, the Joule-Thomson-Kelvin porous plug effect which while inefficient in the closed pressure tube arrangements in which it was first noted was used to advantage in the ejection stream of a compound photonic propulsion system in which a photonic plug of particulate matter and energy prevents gas dynamics disassociation and increases the thrust energy of the reaction system and at the same time mutes the noise produced by the engines. Also, the compound phototonic plug space craft can traverse the atmosphere by the initiation of lift as the dense layers of the atmosphere are encountered to eliminate curvilinear approaches to the landing area and eliminate the necessity of drogues and parachutes, whereby the pathological effect of a g (gravity) density can be reduced and the craft can land perpendicular to the center from the point in space it wishes to establish, and the craft can in fact become a stationary satellite if necessary.

Also, the present invention is such that the photonic plug as indicated by the numeral 113 in FIG. 1, acquires advantages for vertical take off and landing not shown in prior devices including docking in space than in systems which lack a reconstituting photonic plug, and the plug 113 can absorb and dissipate excessive heating as is developed in passing from space through the atmosphere for planetary landing.

There is also provided an improved aerodynamic bi-concave saucer design amalgamated to a compound photonic jet propulsion mechanism for increased safety and maneuverability, stability and quieter aircraft.

As shown in FIG. 1, the photonic plug 113 will have a tendency to have its lower portion spread out as it engages or encounters a surface such as the surface 71.

Furthermore, the air drawn into the spinning console is drawn in such a manner that the intake stream will also be compounded and because the ejection plume is also compounded, there will be the valuable factor in reduction of gradient noise between intake and output, even though propulsion depends on the gradient between intake and discharge.

The present invention provides a surface effect transportation up to subsonic speeds over mounted trackways in which the superior advantages of high pressures and increased thrust adds substantially to safety and speed of transportation under all weather conditions and provides advantage in its relationship to the length of the trackway. The trackway such as the trackway 70 may be placed along or above existing rail lines or along or above transcontinental power transmission lines, rods, or bridges, waterways or the like and may be made of a suitable material such as a metallic substance.

With reference to the trench and the photonic plug on which the craft is supported, the action may be described as a "photonic cushion" or plug as indicated by the numeral 113 in FIG. 1, and this is believed applicable to the description of the craft as a surface effect vehicle.

With further reference to the bi-concave saucer, this is unique inasmuch as it represents a continuous aerodynamic frame unlike current discontinuous wings, deltas, darts, needles and the like, and in principle acquires increased stability as well as other advantages.

The circular console may represent a unique and useful method of adding quantitized rotational energy to axial thrust energy to acquire thrust advantages not previously available through jet operation, and it also reduces engineering problems for the industry. The arrangement of the propulsion system will intermix the thrust and boundary layers of air space adjacent to the craft and thereby increases its stability in the otherwise turbulent air masses that might be traversed.

With further reference to the compound photonic plug, it is to be noted that the speed of combustion varies and is largely determined by the turbulence prevailing in the combustion chamber. Without turbulence it would be too slow and thrust would not be effective. The photonic plug prolongs and exaggerates the turbulence supplying those factors which increase reaction thrust. Thus, in other systems thrust drops precipitously once the wake leaves the chamber.

The present invention is such that as to the console, spinning or curves by natural torque of the reaction and not by use of a worm gear arrangement are possible. In addition, the intake and ejection direction is vertical and perpendicular to the plane of the console in the present invention, wehreas in certain prior devices such as that show in Pat. No. 2,926,869 to Sullivan, the intake and ejection direction is within the plane of the console. It is to be noted that in the present invention intake and ejection direction or moment is vertical or perpendicular to the plane of the spinning console. As previously stated, the injection and ejection moments are the gradient of heat energy which exists between the inlets and outlets of the fan jets and the ram jets of the hybrid console and this does not apply to the rocket engines or the photon engines which have only ejection outlets.

With further reference to the present invention, any combination of ram jets and fan jets may be chosen or utilized in the console unit. By spinning the ejection, compound, wake, wave form, there will be an increase of the ejection plug and there will be introduced a measure of quantitized rotational energy thereby augmenting thrust.

The console can be made up of any number of composite reaction and thrust engines such as ram jets, fan jets, rocket engines and photon engines. The hybrid compound system may include photon engines including ion engines which would be used in space for propulsion, or even in the atmosphere if it were found by experience that by the photon or ion engines usage such action could polarize and cool the reaction flames of the other engines. The advantages of such an arrangement would depend on the mission of the craft and would be of special use in a man-orbiting laboratory. The photon engines such as the photon engines indicated by the numeral 110 in FIG. 2 could be integrally included in the console assembly and can be stopped at will from the astronaut's compartment in the flying saucer or other arrangements. The rocket jets or nozzles such as those indicated by the numeral 108 can be supplied with fuel and oxidizer from compartmentalized cells separated from and within the main fuel compartments which are used for jet fuel, or can be solid rocket engine design included in the console.

With further reference to the present invention, it is to be noted that by spinning the console, the compound ejection wake wave form increases the ejection plug and introduces a measure of quantitized rotational energy thereby augmenting axial thrust. In connection with propulsion, it is to be noted that thrust depends on the gradient between the relatively low air intake density and the augmented density of fuel ablation products. Prior reaction propulsion engines do not augment axial thrust with rotational energy provided by console spinning. Furthermore, a sophisticated and unique approach to thrust mechanical technique would indicate that axial thrust can be augmented by angular thrust produced by the present invention. Furthermore, in prior devices it has been thought that ideally the exhaust should be uniformly axial from the nozzle with no angular momentum. It is also desired to point out that in actual practice such as in athletics that thrust is vastly increased by the angular momentum utilized by the hammer throw (ball and chain), and by the discus which employ augmented rotational energy to accomplish greater thrust difference above actual thrust of the action. In order to overcome mechanical problems arising from the mounting of a plurality of engines, and the fact that centrifugal force produced by spinning would keep fuel from normally arriving from the periphery to the central engines. An arrangement may be employed whereby the fuel is directed in a suitable manner such as that shown in FIG. 3 of the drawings.

As shown in FIG. 3, suitable ball bearing mechanisms can be used as indicated by the numerals 142 and 150, and in addition other accessories such as pinions and the like can be used where desired or required. Such a ball and pinion fitting may permit the fuel to be veined therethrough so that the fuel can be supplied from suitable fuel tanks and the like. Thus, the present invention provides a new method of ducting or directing fuel into the rotating console and the centrally ducted fuel may be spread into the multiple power units by centrifugal force, and the ball bearing pinion arrangement will prevent the large console from fusing by friction.

Attention is again directed to the photonic plug as indicated by the numeral 113 in FIG. 1 inasmuch as this is an important aspect or feature of the present invention.

In both the console arrangements and the crankshaft arrangements axial and angular energy are manifolded to augment reaction thrust, by the addition of quantitized rotational energy.

An example of quantitized rotational energy is manifested in the increased thrust acquired by a discus thrower who is developing thrust energy for projecting the discus *northward,* is by analysis of movements, directs it at sometimes in all other directions including *southward.*

A more sophisticated accomplishment of the same factors involved in quantitized rotational energy can be obtained in part from the cyclotron in which an energy particle is given a series of small pushes as it is sent around a circle before it is ejected in an axial direction at an augmented energy level.

Canting of any one of the multiple engines in the present invention will produce spinning. In addition, since the airframe in the device acts also as a duct, differential pressures in the various engines could produce spinning of the console in the hybrid device as indicated. A sequential ignition of the various engines could also produce spinning of the console.

I claim:

1. In a propulsion system including a track having an upper recessed surface, support elements for said track, drainage openings in said track, a craft including an annular body member which has arcuate top and bottom walls, walls and partitions in said body member defining compartments and chambers, said body member having an inner open portion, a compound jet propulsion unit arranged in said open portion, said body member having operatively associated therewith a yoke having a standard operatively connected thereto, means for rotating said standard and yoke, said compound jet propulsion unit being a spinning console assembly having a base unit, a plurality of fan jets and ram jets in said base unit, a photonic plug produced by the console assembly, and ball bearing and fuel supply means carried by said yoke and operatively connected to the console assembly.

References Cited

UNITED STATES PATENTS 2,730,311  1/1956  Doak _____ 244—12

MILTON BUCHLER, Primary Examiner

J. E. PITTENGER, Assistant Examiner

U.S. Cl. X.R.

60—201; 244—12, 23